May 16, 1933.  G. BLACKSTOCK  1,909,607
AUTOMATIC FRICTION CLUTCH AND TRANSMISSION
Filed April 9, 1931   3 Sheets-Sheet 1

INVENTOR
G. BLACKSTOCK.
BY
ATTORNEYS.

May 16, 1933. G. BLACKSTOCK 1,909,607
AUTOMATIC FRICTION CLUTCH AND TRANSMISSION
Filed April 9, 1931 3 Sheets-Sheet 2

FIG. 2.

INVENTOR
G. BLACKSTOCK.
BY
ATTORNEYS.

Patented May 16, 1933

1,909,607

UNITED STATES PATENT OFFICE

GIBBS BLACKSTOCK, OF TORONTO, ONTARIO, CANADA

AUTOMATIC FRICTION CLUTCH AND TRANSMISSION

Application filed April 9, 1931. Serial No. 528,778.

My invention relates to improvements in automatic friction clutch and transmission, and the object of the invention is to provide a simple, compact and practical form of change gear device of the type disclosed in my copending application Serial No. 428,196. The machine consists essentially of a planetary gear unit with a rotatable reaction member, forming a circular housing for the planetary gears and provided with a clutch of free wheel type to allow its forward but not reverse rotation, and an automatic direct drive friction clutch to lock it to the drive shaft when the parts are synchronized and to release when centrifugal and spring forces are counteracted by load. A light circular gear housing forms the reaction member and it is provided with oil seals so that the clutches can be operated dry, a great advantage with friction clutches. It is an important feature that the clutches engage on synchronization without shock and do not slip under load. The direct drive clutch may be adapted to a variety of uses as an overload release, and the complete device can be used wherever automatic change is required between two drives or different gear ratios. However, for clearness, it has been described here in its preferred form as an auxiliary transmission for a motor car.

When it is placed in series with the ordinary transmission practically all the gear changing is automatic, the gear lever being left in high gear position. The change "up" is effected by slowing the engine to synchronize the parts and the change "down" by overload, generally by deliberately opening the throttle to an extent depending on speed. Owing to the centrifugal element in the control there is a certain speed above which this change cannot occur.

With such an auxiliary device the operator is relieved of practically all gear changing; apart from reversing and emergencies such as very steep hills the only change he has to make manually is sometimes on starting when he starts with the ordinary hand lever in second and changes to high as the car begins to move, as hereinafter more particularly explained.

In the drawings like characters of reference indicate corresponding parts in each figure.

The direction of normal rotation is shown by arrows and "forward" is used to mean in this direction. The front of the machine is to the left in Fig. 1.

Figure 1:
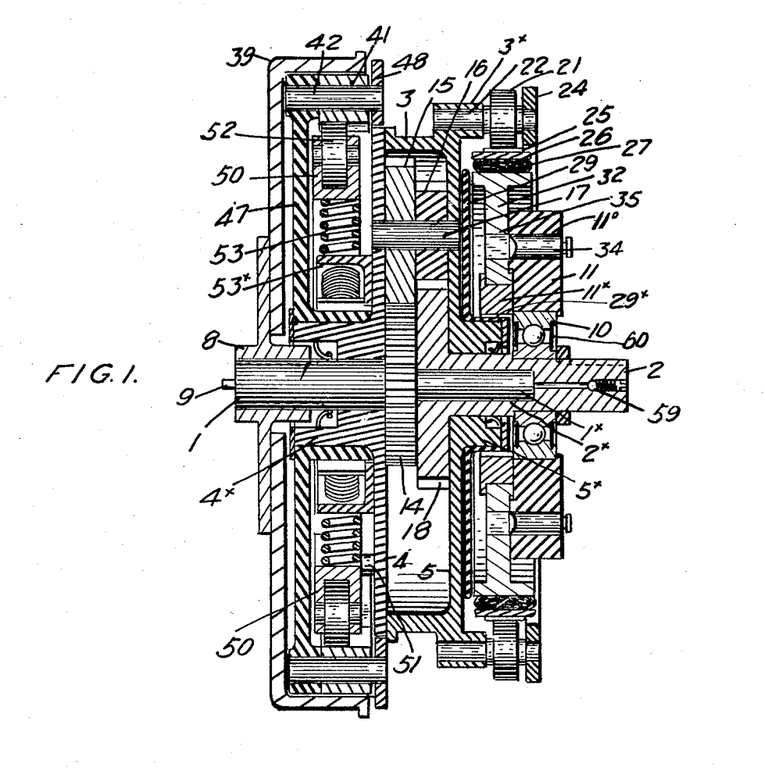
Fig. 1 is a sectional view of the machine.
Figure 2:
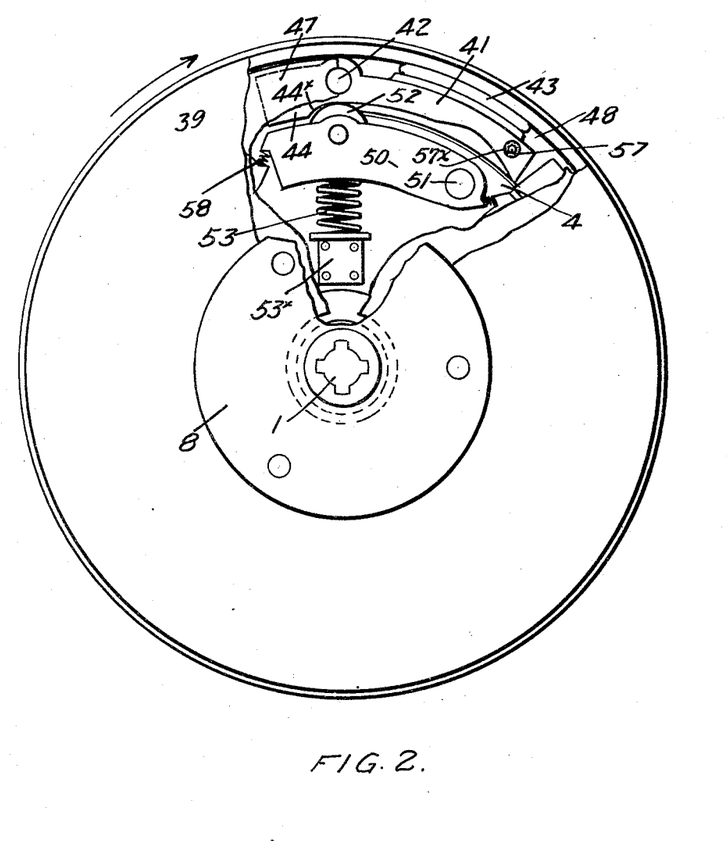
Fig. 2 is a front view showing parts of the direct drive clutch.
Figures 3, 4, 5, 6, 7, 8:
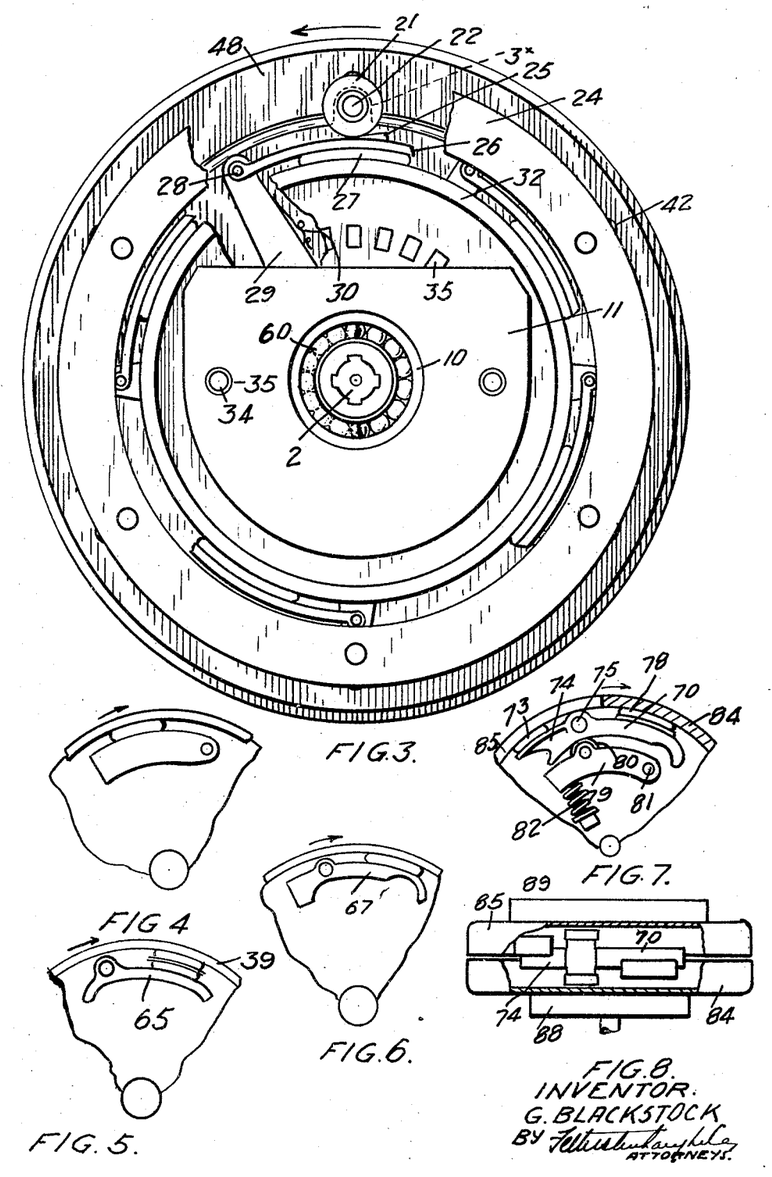
Fig. 3 is a rear view showing parts of the reaction or low gear clutch.
Figs. 4 to 8 show some alternative ways of arranging some of the parts.

Referring to Figs. 1, 2 and 3 the machine is supposed ready to start with the direct drive released.

1 is the drive shaft provided intermediate of its length with a gear 14 secured to or formed integral therewith and with a reduced portion $1^x$. The shaft 1 may be secured by a flexible coupling to a tail shaft from the ordinary gear box, the stud 9 being used for centering.

2 is the driven shaft provided with a gear 18 secured to or formed integral therewith and provided with a central longitudinal bore $2^x$ forming a bearing for the inner or reduced end $1^x$ of the shaft 1. 3 is a combined reaction member and gear housing provided with heads 4 and 5 having centre bearing portions $4^x$ and $5^x$ mounted respectively on the drive shaft 1 and driven shaft 2.

11 is a hub which is secured in a stationary position to the automobile frame and provided with a main bearing 10 in which the driven shaft 2 is mounted. 17 is a counter shaft, of which there may be three, mounted in the heads 4 and 5 of the reaction member 3. 15 and 16 are gears secured together and mounted on the counter shaft 17 and meshing respectively with the driving and driven gears 14 and 18 respectively.

I will now describe the reaction clutch by which the reaction member is enabled to take the back thrust when power is applied to the drive shaft and which is illustrated in Figs. 1 and 3.

32 is a drum which is rotatably mounted on a cylindrical boss 11$^x$ secured to the hub 11. The web of the drum 32 is provided with an annular series of orifices 35. 34 are stout pins which are longitudinally movable in orifices 11° of the hub 11 and engage the orifices 35 of the drum 32. The pins 34 may be linked in any suitable way to the ordinary gear lever so that when such lever is in reverse, neutral or low gear position the pins are withdrawn to allow for reverse as later explained.

22 are studs secured at one end in bearings 3$^x$ formed integral with the reaction member 3 and at the other end in a ring 24. 21 are antifriction rollers mounted on the studs 22. 29 are spider arms extending radially from a sleeve 29$^x$ mounted freely on the bearing portion 5$^x$ of the reaction member 3. 26 are shoes. A shoe 26 is pivoted at 28 to each spider arm 29 and curved concentrically to the periphery of the drum 32 and provided with a friction lining 27 engaging the exterior periphery of the drum 32. 25 is a wedge projection extending from the outer face of each shoe and with which the roller 21 is adapted to engage. 30 is a spring which presses gently against each arm 29 to ensure contact of the shoe with the roller 21 and the drum 32 when at rest. The angle of the wedge 25 is such that the roller 21 does not cause the shoe 26 to slip but jams so that the reaction member cannot revolve backward.

When the power is applied the reaction member receives a backward thrust and the drive shaft an augmented forward thrust, the back thrust being taken up by the reaction clutch, the rollers 21 engaging the wedges 25 and jamming the shoe 26 between such roller and the drum 32. When this condition is produced the shaft 2 is then driven at reduced speed.

If the engine is slowed while the car coasts the reaction member must begin to revolve, the clutch offering no resistance. It slips without pressure for a short time and then the shoes 26 are lifted clear by centrifugal force, the arm 29 moving backward a little, so that the clutch is entirely open.

When the direct drive is released by overload the reaction member quickly comes to rest and the momentum of the shoes and spider acts with the springs 30 to ensure contact of shoes both with the rollers and drum before the back thrust comes. The clutch thus engages on synchronization without any shock.

I will now describe the direct drive mechanism which is illustrated in Figs. 1 and 2 as in the released position.

39 is a drum forming a housing for the direct drive mechanism. The drum 39 is carried by the flanged hub 8 secured to the drive shaft 1. 47 is a disc or spider forming a floating member mounted freely on the bearing portion 4$^x$ of the reaction member 3. 42 are studs secured at one end in the disc 47 and at the opposite end in a ring 48. 41 is a shoe. A shoe is pivoted on each stud 42 and is provided with a friction face 43 for engagement with the inner periphery of the drum 39 and with an extension 44 extending to the rear of the stud 42 which partly balances it when in motion and forms a shoulder 44$^x$ from which at point "$e$" the interior surface is concentric with the drum to the point "$d$". "$d$—$c$—$b$—$a$" is a pocket peculiarly formed for a purpose which will hereinafter appear (see Fig. 9).

50 is a series of weights. Each weight 50 is pivoted on a pin 51 carried by the head 4 of the reaction member 3. 52 is a roller rotatably mounted on the arm 50 and spring pressed against the shoe 41 by the strong spring 53 carried by a bracket 53$^x$ secured to the reaction member 3. The roller in its normal position presses against the shoe 41 very slightly to the rear of the pivot 42. 57 is a stud extending between the disc 47 and ring 48 covered with some yielding material and passing through an orifice 57$^x$ near the forward end of the shoe thereby limiting the movement of the shoe so that when releasing the drum it clears the same by a very small distance.

The reaction member is now at rest. When the engine is throttled and the drive shaft slows down it revolves and the shoe is brought into easy slipping contact with the drum by the roller running forward and then by the centrifugal action of the shoe which is only partially balanced by the part 44.

Figure 9:
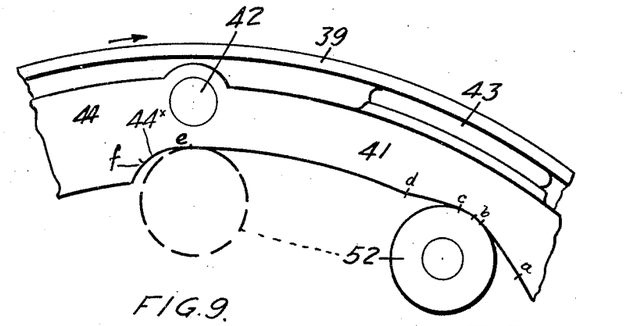
Fig. 9 shows in detail a shoe of the direct drive clutch on an enlarged scale.

As long as the drum 39 is moving faster than the shoe 41 the roller 52 tends to stay at or to the left of the pivot 42 (and to ease the slipping pressure) but as soon as the speed of the reaction member 3 becomes greater the roller 52 runs without effort along the concentric portion of the shoe toward the point "$a$" in Fig. 9. If the slope "$b$—$a$" is not too steep the shoe 41 does not slip at all during engagement, but jams and the shock is cushioned by the spring 53 and the small cushion spring 58 whose chief function is to prevent the roller from jumping off the end of the shoe. If the surface is more steeply inclined inward at "$a$" the shoe may slip for an instant, this slip absorbing the shock.

When the throttle is reopened the roller 52 takes a position between "$c$" and "$d$" this surface nowhere having a steep enough inclination to cause slipping of the shoe.

As long as the centrifugal and spring forces are great enough to hold the roller 52 in the pocket "*bcd*" the reaction and driving members are locked together by the shoe, producing direct drive between drive and driven shafts.

When the load is great enough the roller 52 is forced inward and backward to "*d*" and then it runs without effort along the surface "*d—e*" concentric with the shafts. When it arrives at "*e*" the direct drive clutch is entirely released and the release occurs without slip as the resistance is overcome before it begins.

The shoe swings in through a very small distance (say a hundredth of an inch at the lining) on the padded stop stud 57 while the roller may momentarily run inward and backward from "*e*" toward "*f*". The clutch is now released.

If the drive shaft is turned backward the direct drive clutch will engage and the machine will seize unless there are means for allowing reverse rotation of the reaction member. For this reason the sliding pins or bolts 34 are provided. When the car is to be driven backward these are withdrawn and the drum member 32 is free to revolve. As before stated pins may be linked in a variety of ways to the gear lever so that when it is in the reverse, neutral or low gear position they are withdrawn.

The preferred method is to have the pins subject to spring pressure tending to force them into the recesses 35, their ends being bevelled one right and one left hand so that whichever way the disc 32 turns one will catch and allow the other to engage as well. The pins are then linked to the gear lever so that when it is moved to the side to engage the ordinary low or reverse trains the pins are withdrawn, and after it is moved back to neutral they are again pressed by the spring into the first notches they meet.

This arrangement allows the direct drive clutch to be released (by moving the lever into low position for an instant) before starting the car, if it has been left engaged. Generally this is not necessary as the car can be started with the lever in second gear position if the clutch has been left engaged, when it releases as the car starts. If there is a sharp gradient it is better to release it beforehand.

If, after reversing, the car is started forward in either second or high gear the pins will engage while the engine clutch is being let in as the drum 32 begins to move.

With a light car or one with a flexible engine almost all driving can be done with the lever in high gear position. In other cases the start is made in second, the lever being moved to high as the car begins to move, without having to "hesitate" or "double declutch" as with manual changes at higher speeds. With the ordinary low gear train cut out (by connection to the locking pins) the car has still three speeds forward with automatic change between the two higher.

When the machine is being driven backward the roller 52 in Figs. 2 and 9 will be between "*b*" and "*a*", so the slope of the cam here is made small enough to jam the shoe, otherwise the clutch can slip and will transmit only limited load, unless there are provided manually operated means for locking the reaction member to the driving flange 8, which can be accomplished in any conventional manner. If the machine is placed in front of the ordinary gears the drive shaft revolves only forward. It then is not necessary to allow for backward rotation of the drum 32, and the curve "*b—a*" on the high gear shoe 50 need not be designed to ensure jamming.

When the machine is placed at the rear of the gear box it is provided with a light housing to exclude dust and mud. The clutches remain dry and clean, the oil or grease being retained in the gear chambers 3, 4 and 5 by the seals 60. Leather seals are capable of standing a good pressure but it is easy to make sure that they do not leak by providing a safety valve 59 so that pressure due to overheating gears expels oil to the universal joint. The rollers 21 and 52 may conveniently be ball bearings of the sealed type (requiring no attention or oiling) as may be the main bearing 10.

The drum 32 where it is mounted on the hub $11^x$ and the pins or locking bolts 34 are easily accessible for lubrication from the rear and may be carefully treated to a little hard grease occasionally. Since the gears are not rolling at all during direct drive the lubricant need be changed very seldom and this operation is simple if the dust housing has openings on top and bottom. As the clutches do not slip under load the life of the brake linings on the shoes is indefinite so the device once fitted needs practically no attention except occasionally at easily accessible places.

In addition to the fact that all parts revolve together during direct drive the use of the planetary system has been shown to facilitate the operation of the clutches. In case of the low gear clutch motion of the reaction member is used to hold the clutch wide open when released and the momentum effect of the shoes, etc., while it is being brought to rest acts to wedge the shoes in position so that it cannot begin to go backward before the clutch grips.

In the high gear clutch the absence of motion when released makes it easy to hold the shoes off the drum, while centrifugal force due to motion during the change to engagement is made use of to bring the shoes into light slipping contact. These advantages are attributable to the carrying of the clutch parts on the reaction member, which has the further advantage that the direct drive clutch has to transmit only about half the torque when engaged the rest being taken by the gears. The direct drive clutch may be regarded as a centrifugal clutch with two important improvements. First the spring reinforcement of centrifugal force and second the means preventing slip under load, the advantages of which have been mentioned.

The use of the springs 53 makes possible the use of lighter weights eliminating much of the needlessly high pressures at high speeds. It has a further advantage in that the combination of spring force, the same at all speeds, and centrifugal force, rapidly increasing with speed, can be made to give almost any desired relation of locking power to speed.

In Fig. 4 is shown part of a simple centrifugal clutch differing from the usual form in having the weight on the reaction member. Such a clutch would function as the one in Fig. 2 in a crude manner but would slip under load during release and more during engagement. If it were fitted with a strong spring it would be necessary to provide means for neutralizing the spring when it is released (or it would slip under pressure) and this is what has in effect been done in the direct drive clutch by separating the arm into two parts, the weight and the shoe. The simple clutch must have heavier weights to give the same locking power as the other at moderate speed, so at high speeds it will produce greater stresses and necessitate a heavier drum as well. The clutch of Fig. 2 can if desired be made with heavy springs and quite light weights, as the fundamental function of the latter is really to make the locking power increase with speed faster than does the engine torque.

The action of the roller 52, in Fig. 9, on the cam surface "c—d" is essentially a wedging action. The important thing is that if the slope of the surface is small enough the ratio of shearing to normal force on the shoe is less than the coefficient of friction.

In Figs. 5 and 6 the functions of providing clutch pressure and locking power have been differentiated, as a clutch may have some shoes of each type 65 and 67.

As long as these relations are preserved the effect need not be got by wedging action, but if some shoes have "steeper" cams as 67 in Fig. 6 others must have more "level" ones as 65 in Fig. 5.

In designing a clutch where some of the shoes have a "steep" slope "c—d" the total locking power and the total clutch pressure are calculated for speeds up to that where the locking power becomes greater than the engine torque to make sure that the clutch will unlock before slipping. The differentiation may be carried still further, the shoe 67 becoming merely a cam secured to the floating member. There may be all graduations between this and a clutch having all its shoes as in Fig. 9. If a clutch has say four shoes like 65 and two like 67 it may have very strong spring pressure and little weight coacting with the shoes 65, and moderate spring pressure and moderate weight coacting with the shoes 67, each of these weights may be considerably lighter than the one 50 in Fig. 2 because the locking power can be made up by having the cam surface at "d" very much steeper (since we are not now relying on wedging action). This is of practical importance where lightness is particularly desired.

In Figure 9 the cam surface from "d" to "e" is shown as concentric with the drum, so that the roller can move over it without effort and not push the shoe along on the drum. This is the preferred design, but I think it can be seen that perfect concentricity is not necessary as long as the slope between these points is always so small that the shoe is not pushed on the drum, obviously the nearer the point "e" the more perfect the concentricity should be.

The reaction clutch being a simple free wheel clutch may be replaced by other forms such as a ball or roller clutch for example. The form shown in Fig. 3 is very sure in action and engages with no shock. It and the direct drive clutch are well adapted to operation in very cold weather where roller clutches might occasionally slip.

Although the floating pivoted clutch shoe is particularly adapted to use with a planetary system it is not restricted to such constructions. Figs. 7 and 8 are fragmentary sketches indicating how a pivoted shoe may act for two clutches in a machine with countershaft reduction gears.

The shoe has two parts 70 and 74 pivoted to a floating spider at 75. The weight 79 has a spring 82 and is swung at 81 on the driven part, its roller 80 can run along the cam surfaces of 70 and 74. The lining 78 on the part 70 coacts with the direct drive drum 84 secured to the drive shaft 1, and the lining 73 on the part 74 with the drum 85 secured in the gear 89 driven by constant mesh gears from the gear 88 on the drive shaft, 89 going say at about half the drive shaft speed. The roller 80 is in the pocket at the end of the part 70 when the drive is direct and the lining 73 then just clears the drum 85.

When the load is great enough the roller moves inward out of the pocket and then will oscillate across the pivot line alternately pressing the two parts of the shoe on the respective drums. When 78 touches 84 the shoe is pulled forward, the roller 80 presses the lining 73 on the slower drum 85, the shoe then receiving a backward pull. This goes on until the drum 85 overtakes the driven shaft when the roller jams the arm 74 whose inner surface is inclined inward at a small angle, and the lower gear train takes up the drive.

When the drive shaft speed is reduced a similar oscillating action goes on until the drum 84 falls to driven shaft speed when the roller 80 returns to the direct drive pocket. This design amounts to a combination of the high and low gear clutches in one set of pivoted shoes.

Although it cannot be expected to work as smoothly as the other construction it should be noted that the linings do not slip under load. The arm 70 is light in weight so that the shoe is approximately balanced about the pivot, and the clearances of the linings are exceedingly small.

What I claim as my invention is:

1. A friction clutch device comprising a drum, a floating and an adjacent member having an arc of mutual freedom, resilient pressure members on the adjacent member and pivoted shoes on the floating member having friction linings to engage the drum and cam surfaces over which the pressure members run as the floating and adjacent members undergo relative motion, said cam surfaces extending from near the pivots where pressure of the pressure members does not press the shoes on the drum toward the ends of the shoes where it does press them on the drum, and a locking control device for locking the floating member at one end of the aforesaid arc with the shoes forced on the drum by the pressure members and for unlocking it to allow the relative motion of the drum to carry the floating member across the arc to a point where the pressure members are applied at the pivots of the shoes.

2. A friction clutch device comprising driving and driven parts, a drum, a floating and an adjacent member having an arc of mutual freedom, resilient pressure members on the adjacent member, pivoted shoes on the floating member having friction linings to engage the drum and cam surfaces over which the pressure members run as the floating and adjacent members undergo relative motion, said cam surfaces extending from near the pivots where pressure of the pressure members does not press the shoes on the drum toward the ends of the shoes where it does press them on the drum, and pockets in the cam surfaces at a distance from the pivots into which the pressure members enter to lock the floating and adjacent members in the driving position and out of which they are forced as overload counteracts their pressure, such action being followed by motion of the pressure members toward the pivots thus releasing the clutch.

3. In a friction clutch device, the combination with driving and driven parts, a drum, a floating and an adjacent member having an arc of mutual freedom, resilient pressure members on the adjacent member, pivoted friction shoes on the floating member having cam surfaces over which the pressure members run as the floating and adjacent members undergo relative motion, the said cam surfaces extending from near the pivots where pressure of the pressure members does not press the shoes on the drum toward the ends of the shoes where it does press them on the drum, and means for holding the floating and adjacent members in the driving position with the shoes pressed on the drum and for moving them to the released position where the shoes are not pressed on the drum, of means actuated on synchronization by retardation of the driving part for returning the clutch to the driving position.

4. In a friction clutch device, the combination with driving and driven parts, a drum, a floating and an adjacent member having an arc of mutual freedom, resilient pressure members on the adjacent member, pivoted friction shoes on the floating member having cam surfaces over which the pressure members run as the floating member moves relatively to the adjacent member, means for locking the floating member in the driving position with the pressure members forcing the shoes against the drum, of weights incorporated in the device and carried subject to centrifugal force and to inward force due to load, means actuated by inward movement of the weights due to overload for unlocking the floating member and moving it to the released position where the pressure members act near the pivots of the shoes and do not force them on the drum, and means actuated on synchronization by retardation of the driving part for returning the floating member to the driving position.

5. A friction clutch device comprising driving and driven parts, a drum, a floating and an adjacent member having an arc of mutual freedom, resilient pressure members on the adjacent member, pivoted shoes on the floating member having a friction lining to engage the drum and cam surfaces over which the pressure members run as the floating member moves relatively to the adjacent member, said surfaces extending from near the pivots where pressure of the pressure member does not press the shoes on the drum toward the end of the shoes where it does press them on the drum and pockets in the cam surfaces adjacent such shoe ends, aforesaid pressure members being spring pressed weights each having an antifriction projection caried by its free end and adapted to enter the said pocket to lock the floating member in the driving position with the shoe and to press the shoe against the drum, and adapted to move out of the pockets as the weights are forced inward against spring and centrifugal forces by overload and to move toward the pivots of the shoes thus releasing the clutch.

6. In a friction clutch device of the type described, the combination with driving and driven parts, a drum, a floating and an adjacent member having an arc of mutual freedom, pivoted friction shoes on the floating member, resilient pressure members on the adjacent member adapted to press the shoes on the drum when the floating member is at one end of its arc in the driving position and not to press them on the drum when it is in the released position at the other end of the arc, and means actuated by overload for moving the floating member to the released position and by synchronization and retardation of the driving part for returning it to the driving position, of means for preventing the slip of the shoes on the drum under load when engaged or during the act of release or re-engagement.

7. A friction clutch device comprising driving and driven parts, a drum, a floating and an adjacent member having an arc of mutual freedom, resilient pressure members on the adjacent member, pivoted shoes on the floating member having friction linings to engage the drum and cam surfaces over which the pressure members run as the floating member moves relatively to the adjacent member, said surfaces extending from near the pivots where pressure of the pressure members does not press the shoes on the drum toward the ends of the shoes where it does press them on the drum and where there are pockets in the cam surfaces, the aforesaid pressure members consisting of spring pressed weights having projections adapted to enter the said pockets and lock the floating member in the driving position with the shoes thus pressed on the drum, and adapted to move out of the pockets as the weights are forced inward against spring and centrifugal forces by overload and to move toward the pivots of the shoes thus releasing the clutch, the contours of the cam surfaces being such that the pressure members can move between the depths of the pockets and the pivots of the shoes without causing the clutch to slip, the inclinations of cam surfaces to the drum over this range being such that the ratio of total shearing force on the linings to total clutch pressure is less than the coefficient of friction.

8. A friction clutch device comprising driving and driven parts, a drum, a floating and an adjacent member having an arc of mutual freedom, resilient pressure members on the adjacent member, pivoted shoes on the floating member having friction linings to engage the drum and cam surfaces over which the pressure members run as the floating member moves relatively to the adjacent member, extending from near the pivots where pressure of the pressure members does not press the shoes on the drum toward the ends of the shoes where it does press them on the drum and where there are pockets in the cam surfaces, the aforesaid pressure members being spring pressed weights having projections adapted to enter the said pockets locking the floating member in the driving position with the shoes thus pressed on the drum, and adapted to move out of the pockets as the weights are forced inward against spring and centrifugal forces by overload and to move toward the pivots of the shoes thus releasing the clutch, the sides of the pockets remote from the pivots being of such contour that on the application of reverse torque the pressure members positively jam the shoes on the drum, the inward motion of the pressure members being limited to prevent their running off the cams.

9. In a friction clutch device of the type described, the combination with driving and driven parts, a drum, a floating and an adjacent member having an arc of mutual freedom and pivoted friction shoes on the floating member and resilient pressure members on the adjacent member to press the shoes on the drum when the floating member is at one end of the arc in the driving position and not to press them on the drum when it is in the released position at the other end of the arc, of means by which the adjacent and floating members are brought to rest after the release of the clutch and set in motion when the driving part is retarded, the shoes being so mounted that they are clear of the drum when at rest and having a light slipping contact due to centrifugal force when in motion, such slipping contact acting to move the floating member to the driving position on synchronization.

10. In a change gear device of the planetary type having a rotatable reaction member and releasable means for producing a direct drive, a clutch for allowing forward and preventing reverse rotation of the reaction member comprising a stationary drum and friction members carried on or with the reaction member, the friction members being so weighted that centrifugal force tends to hold them clear of the drum when in motion and momentum tends when the reaction member speed is checked to bring them into contact with the drum, and means for jamming them against the drum when at rest to prevent reverse rotation of the reaction member.

11. In a change gear device of the type described having a rotatable reaction member and releasable means for producing a direct drive, a clutch for allowing forward but preventing reverse rotation of the reaction member comprising a stationary drum, a carrier having some angular freedom with respect to the reaction member and pivoted shoes thereon, wedge cams on the shoes and coacting antifriction rollers on the reaction member adapted to jam the shoes on the drum to prevent reverse rotation of this member but to allow its forward motion, spring means to exert a light turning effort on the carrier in a direction to hold the cams and shoes in contact with the rollers and drum when at rest without load, and weighting means coacting with the shoes adapted to hold them clear of the drum by centrifugal force when in motion and by momentum when the reaction member speed is checked to bring the cams and shoes in contact with the rollers and drum.

12. In a change gear device having drive and driven shafts and a reduction gear system of planetary type, the combination with a closed rotatable gear housing forming the reaction member of the system and friction clutches for locking it alternately to the drive shaft and to a stationary member, of means for retaining lubricant with the gears and preventing its access to the clutches comprising suitable seals capable of standing moderate pressure, and a safety valve set for a lower pressure leading to a point from which lubricant cannot reach the clutches.

13. A friction clutch device comprising an annular member, a friction member and a floating member on which the friction member is carried, an adjacent member with respect to which the floating member has an arc of mutual freedom, means by which the friction member is pressed on the annular member when the floating member is in one position, the driving position but not when it is in another position, the released position, means for holding the floating member in the driving position, and means for moving it to and from the released position without causing the clutch to slip under load.

14. A friction clutch device comprising an annular member, a friction member and a floating member on which the friction member is carried, an adjacent member with respect to which the floating member has an arc of mutual freedom, means by which the friction member is pressed on the annular member when the floating member is in one position, the driving position, but not when it is in another position, the released position, means for holding the floating member in the driving position and means for moving it to and from the released position without causing the clutch to slip under load such floating member control means including weights carried between the floating and adjacent members so as to be subject to centrifugal force and to inward force due to load, and means actuated by inward motion of the weights due to overload for moving the floating member to the released position, the clutch being adapted to re-engage on synchronization.

15. In a friction clutch device, the combination with the drive and driven shafts and a reduction gear system having a rotatable reaction member, of means for releasably connecting the drive shaft and reaction member to produce a direct drive and comprising a drum on the drive shaft, a floating member having an arc of mutual freedom with respect to the reaction member, spring pressed centrifugal pressure members on the reaction member, pivoted shoes on the floating member having a friction lining to engage the drum and cam surfaces over which the pressure members run as the floating member moves relatively to the reaction member, said surfaces extending from near the pivots where pressure of the pressure member does not press the shoes on the drum toward the end of the shoes where it does press them on the drum and pockets in the cam surfaces adjacent such shoe ends, aforesaid pressure members being spring pressed weights each having an antifriction projection carried by its free end and adapted to enter the said pocket to lock the floating member in the driving position with the shoes and to press the shoe against the drum, and adapted to move out of the pockets as the weights are forced inward against spring and centrifugal forces by overload and to move toward the pivots of the shoes thus releasing the clutch.

16. A change gear device of the planetary type having drive and driven shafts, gears, a rotatable reaction member with a one way brake to prevent its reverse rotation, and a direct drive clutch between the drive shaft and reaction member comprising a friction faced member on one and coacting friction members carried with the other, means for effecting driving engagement of the friction members on synchronization as the drive shaft is retarded, weights carried subject to centrifugal force and to inward force due to load, and mechanism actuated by inward motion of the weights due to load to release the friction members from such engagement.

17. A change gear device of the planetary type having drive and driven shafts, gears, a rotatable reaction member with one way brake to prevent its reverse rotation, and a direct drive clutch between the drive shaft and reaction member comprising a true annular friction face on one and coacting friction members carried with the other, means for effecting driving engagement of the friction members on synchronization as the drive shaft is retarded, weights carried subject to centrifugal force and to inward force due to load, and mechanism actuated by inward motion of the weights due to load to release the friction members from such engagement.

18. A change gear device comprising drive and driven shafts, gears of planetary type with a rotatable reaction member having a one way brake to prevent its reverse rotation and an automatic direct drive clutch including a friction faced member secured to the drive shaft and coacting friction members carried with the reaction member to engage said face, centrifugal weighting means on the reaction member adapted to hold the friction members in driving engagement with the aforesaid friction faced member when the reaction member is revolving, means for releasing the friction members from such engagement as overload overcomes the effect of centrifugal force, and means for preventing the pressing of the friction members on the friction face surface as long as the reaction member is at rest.

19. A change gear device comprising drive and driven shafts and gears of planetary type with a rotatable reaction member having a one way brake to prevent its reverse rotation and an automatic direct drive clutch including a member secured to the drive shaft and having a true annular friction face, friction members carried with the reaction member to engage the said face, centrifugal weighting means on the reaction member adapted to hold the friction members in driving engagement with the annular face when the reaction member is revolving, means for releasing the friction members from such engagement as overload overcomes the effect of centrifugal force, and means for preventing the pressing of the friction members on the annular face as long as the reaction member is at rest.

GIBBS BLACKSTOCK.